TRUNK HUNTING IN CENTRAL CROSSPOINT ARRANGEMENTS CONTROLLED BY MARKERS

Filed Jan. 23, 1967

Oct. 14, 1969 H. SCHONEMEYER ET AL 3,472,969

TRUNK HUNTING IN CENTRAL CROSSPOINT ARRANGEMENTS CONTROLLED BY MARKERS

Filed Jan. 23, 1967 2 Sheets-Sheet 2

3,472,969
Patented Oct. 14, 1969

3,472,969

TRUNK HUNTING IN CENTRAL CROSSPOINT ARRANGEMENTS CONTROLLED BY MARKERS

Hilmar Schonemeyer, Ditzingen, and Herbert Siegel, Munchingen, Germany, assignors to International Standard Electric Corporation, New York, N.Y., a corporation of Delaware Filed Jan. 23, 1967, Ser. No. 611,076
Claims priority, application Germany, Feb. 17, 1966, St 24,999
Int. Cl. H04m 3/12
U.S. Cl. 179—18 3 Claims

ABSTRACT OF THE DISCLOSURE

A holding potential is applied to established paths in a crosspoint network to prevent releases during the short interim period while a path is being established.

Figure 1:
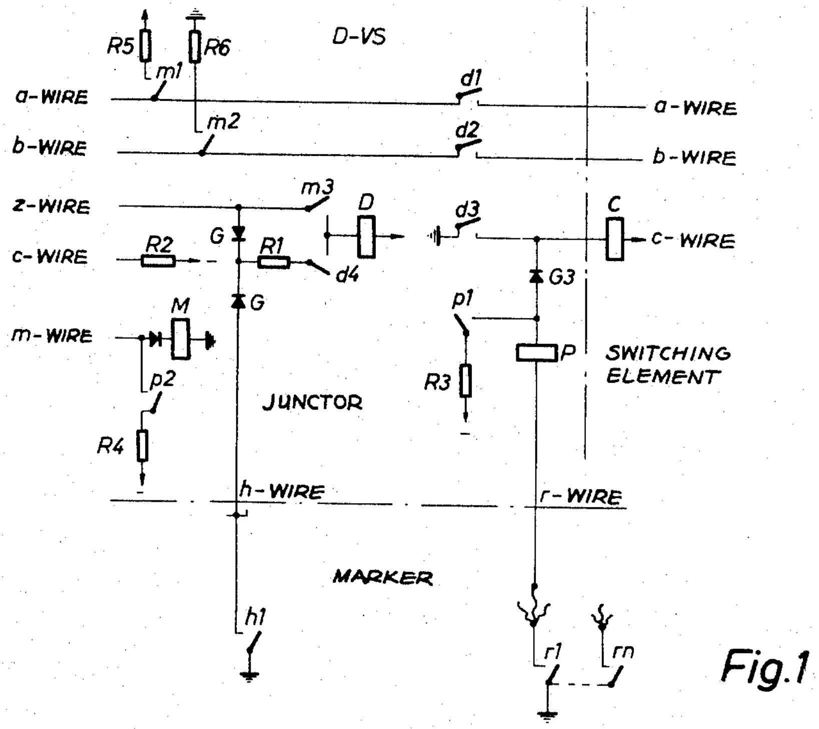

The invention relates to a circuit for controlling the establishment of a connection in telecommunication switching systems and more particularly to telephone exchange systems using marker-controlled central crosspoint arrangements in free hunting modes of operation.

It is sometimes necessary to complete a connection to any idle line from among a group of similar lines by a free hunting process. To do this, it is necessary that such a line be selected from the available group of lines only when the selected line does not already serve an existing connection. Therefore, facilities are generally provided in exchanges to check the lines of a group of lines to find their respective idle or busy conditions. The selected line is sized and blocked against another possible seizing. The expenditure required for such free hunting facilities is primarily determined by the number of lines or crosspoints available for selection and on the speed of the testing process.

A difficulty in the testing process involves releasing of connections. More particularly, a plurality of switching means are included in an established connection. Their windings are switched off at the moment when the connection is released. However, this is without an immediate reaction of these switching means because a certain time elapses after the winding is de-energized and before the crosspoint contacts open. The duration of this time period is determined by the construction and electrical properties of the switching means. Thus, there is an unguarded interval after release and before the actual idle condition is, in fact, achieved.

In some networks, the condition of a so-called releasing connection differs from the idle condition only in that a second of two windings of a seizing relay has not yet been short-circuited. That, in turn, means that the resistance in the testing circuit is somewhat higher during the releasing condition than it is during the actual idle condition. Therefore, depending upon the kind of technique used in the exchange facilities, the magnitude of a current or potential at defined points of such an exchange may be used as a criterion for testing for releasing connections.

Various methods are known for accomplishing these ends. For example, the German printed application (DAS) 1,125,002 proposed the use of a high-ohmic, quickly operating selector as part of the exchange facilities. The respective operating condition of these selectors is determined with the aid of switching means using conventional relay techniques. Through this use of such a high-ohmic, quickly selector, one exchange facility is selected from among the exchange facilities that are available. Selection is made without considering the probability of an existing releasing condition. After the selection, the exchange facility is tested individually to determine whether it is in the release condition or not. If there is such a release condition, the selected exchange facility is released by disconnecting the respective test wire.

This and other known methods of providing a double testing of the connection, results in a disadvantage because there is an undue delay. Moreover, such methods require a considerable technical and financial expenditure to provide the suitable double testing means.

In the newer telephone systems, it is difficult to tune the testing means to the different resistance values. Moreover, the current and voltage tolerances prevailing in the exchange facilities become too expensive. Also, high cost electronic testing means should be provided in order to recognize releasing connections.

An object of the invention is to provide a reliable control for the establishment of the connection, particularly considering the problem of the releasing connections.

According to one aspect of the invention, a potential is applied to all control wires of the switching network at the beginning of the marking process. This potential holds the established connection paths and becomes effective at all outputs of the crosspoint arrangement as a holding potential. Thus, any paths which are in the process of releasing at the beginning of the marking process, are held by the applied potential during said marking process, and they do not enter into the search. The particular advantage of this method is that the problem of the releasing connections does not occur at all during the marking process. This aim can be achieved with the aid of several different means which are appropriate to different systems.

Figure 2:
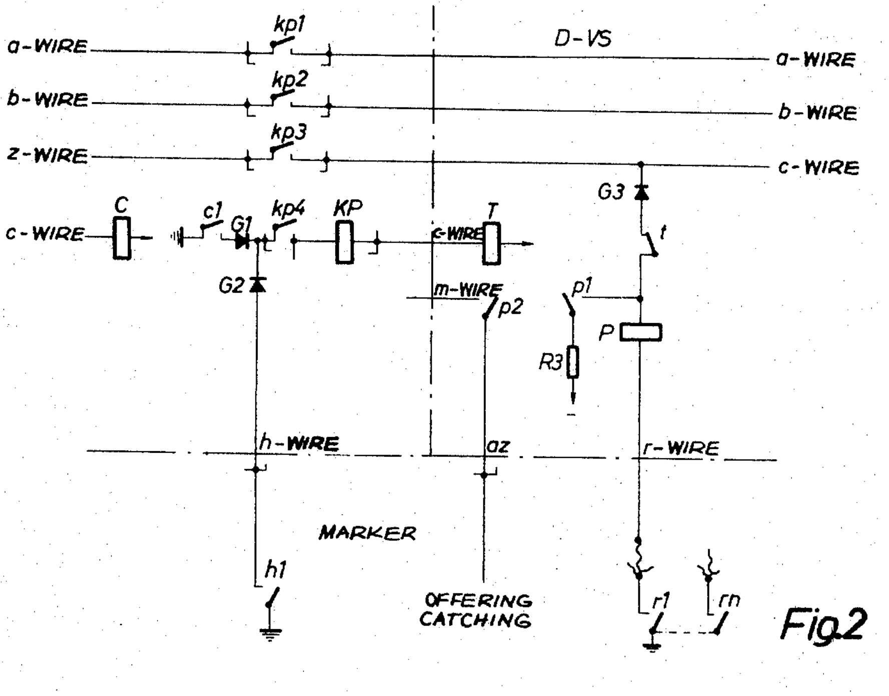
Figure 3:
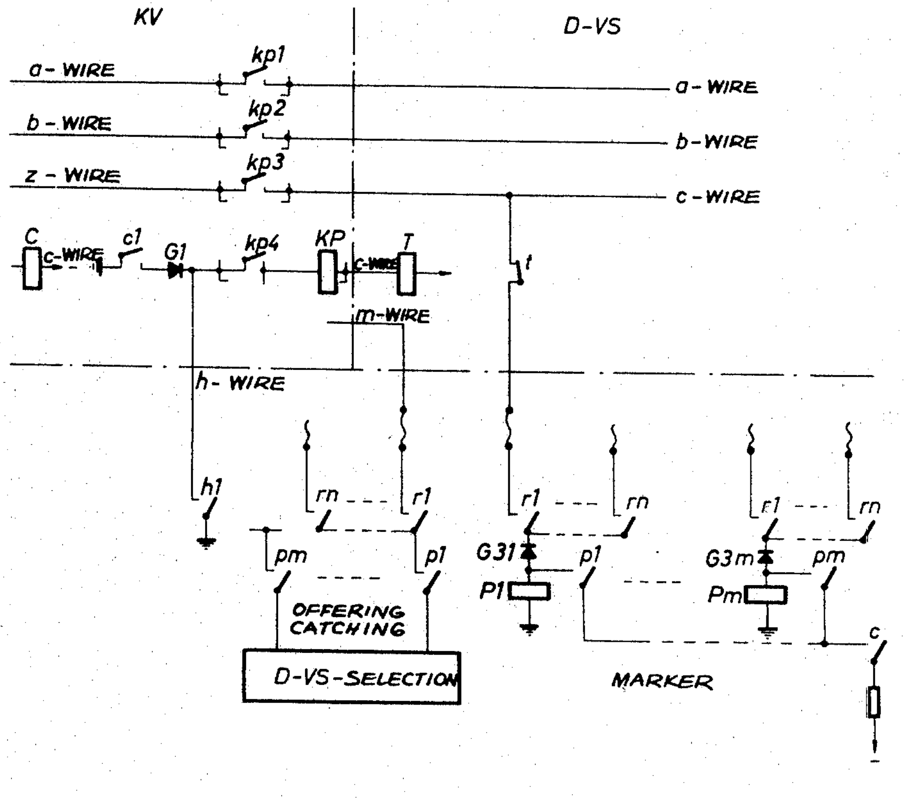

The above mentioned and other features of this invention and the manner of obtaining them will become more apparent, and the invention itself will be best understood by reference to the following description of an embodiment of the invention taken in conjunction with the accompanying drawings, in which:

FIGS. 1, 2 and 3 show three different embodiments of the invention.

FIG. 1 shows a junctor D–VS which may be one cascaded stage in a switching network. This stage forms the connecting element of each outgoing line extending to other exchange facilities. Stated another way, the D in the reference character D–VS indicates that there may be other stages A, B, and C which are not shown. This junctor includes five-wire lines (*a*-, *b*-, *c*-, *m*- and *z*-wire) which include the usual three-wire local lines (*a*-, *b*- and *c*-wire). The other two wires are used to apply the offering signal. Moreover, the potentials for making the through-connecting test are applied to the *a*-, *b*- and *z*-wire through contacts *m*1, *m*2, and *m*3.

At the beginning of the marking process, a marker applies a holding potential (ground) through a contact or a number of contacts *h*1 to all junctors D–VS. If the junctor is busy relay D is operated and held by this ground via its contacts *d*4. This prevents the through-connecting relay D from dropping during the marking process. The marker applies ground potential to all test relays P in the group of lines which are to be actuated, via a contact *r*1 . . . *rn* of one of the directional relays R1 . . . R*n* (not shown on the drawing), but common in most markers. All of the test relays P are so energized in the junctors of the selected group. Relay P is high-ohmic so that in the now formed testing circuit (ground, contact *r*1, *r*-wire, relay P, rectifier G3, *c*-wire, seizing relay C, in the switching element reached, minus potential) the relay C is energized under marginal current conditions. Relay P itself can only respond in the junctors in which the contact *d*3 of relay D has not applied a seizing ground potential to the outgoing *c*-wire.

Among the junctors in which the test relay P has operated, one is selected in any known selecting process, initiated by marking the route searching wire *m* through contact *p*2 and operating the relay M. Probably, this junctor has been reached over several switching stages. The holding potential (ground) is applied through contacts *h*1 to the *z*-wire after a predetermined time which is allowed for the testing. The relay D is initially energized, via contact *m*3, when relay M operates. However, this relay is held operative through a one contact *d*4 after relay M has dropped. Relay M is energized only during the marking process.

When relay D has pulled up, the speech wires *a* and *b* and the seizing wire *c* are through-connected to the outgoing line at contacts *d*1, *d*2, and *d*3.

FIG. 2 shows another embodiment according to the invention. Here, there is no through-connecting relay D (FIG. 1). Instead, a busy junctor is held in the seized condition via the *h*-wire. The crosspoint KP is in the last cascaded stage in the direction of the outgoing traffic. In series with the crosspoint KP is a disconnecting relay T. Through its contact *t,* relay T disconnects the *r*-wire from the *c*-wire, thereby preventing a response of relay P in a busy junctor. In this circuit arrangement, the undelayed release of the following switching elements is of particular advantage during the marking process because the *c*-wire is through-connected and the seizing potential (ground) is removed from a preceding switching element. Moreover, one may desist from applying the test potentials because the through-connecting test potentials in the following switching elements are applied partly over the switching means (the *a*-wire is used for dial pulses, and the *c*-wire is used for seizing). The testing circuit has such a high-ohmic characteristic that the switching means inserted in the test circuit (relay P) does not respond to the dial, seizing, and other signals appearing on the switch path (e.g. wire *c*).

FIG. 3 shows a supplementing arrangement which applies the principle shown in FIGS. 1 and 2. Here the testing means (relay P) is not associated with the junctor D–VS individually for each D–VS, but is centralized in the marker along with its decoupling diode G3*l*–G3*m*. However, two directional contacts (*t, r*1) are inserted for each junctor D–VS. This means only a reduction in the number of relay windings and decoupling diodes. But with such an arrangement the selection of the junctor D–VS can be made in the marker itself. Thus, the route searching network need not perform this task, as is necessary in the circuit arrangements shown in FIGS. 1 and 2. Only the junctor D–VS participates in the selecting process during which it is first selected. This is done by pulling up of the corresponding P relay in the marker. The marking potential received through the associated route searching wire *m* indicates that there is a possibility of connecting the originating junctor to the junctor D–VS. This method can be applied in exchange systems with stage markings as well as for a far-reaching route search.

While the principles of the invention have been described above in connection with specific apparatus and applications, it is to be understood that this description is made only by way of example and not as a limitation on the scope of the invention.

We claim:

1. A system for controlling the establishment of a connection in a network comprising an arrangement of crosspoints, including voice and control wires, common control means for applying markings to said network to control said crosspoint arrangement during a searching process, means responsive to the start of said marking process for applying a holding potential to all of said control wires in said switching network, means responsive to said holding potentials for holding all established connecting paths, and means at the output end of said paths and responsive to said holding potential for holding equipment seized during said marking process for the duration of said marking process.

2. The system of claim 1 and means associated with a junctor at said output end for applying the holding potential through a make-contact of a relay which is energized at the beginning and during the marking process, and means in said junctor comprising a make-contact and control winding of a through-connecting relay for holding in a closed position a contact in the outgoing control wire and for short-circuiting a busy test relay associated with the junctor.

3. The system of claim 1 and means for applying the holding potential to the crosspoint arrangement via a make-contact of a relay energized at the beginning and during the marking process, each of said crosspoints having a make-contact, said holding potential being applied through the make contact of the last crosspoint in the direction of the outgoing traffic and to the control winding of said crosspoint, and means comprising a break-contact of a disconnecting relay series-connected with said crosspoint for disconnecting a busy test relay from the control wire associated with the junctor.

References Cited

UNITED STATES PATENTS

| | | | |
|---|---|---|---|
| 2,934,607 | 4/1960 | Lomax | 179—18 |
| 3,294,921 | 12/1966 | Bergholtz et al. | 179—18 |

KATHLEEN H. CLAFFY, Primary Examiner

W. A. HELVESTINE, Assistant Examiner